(12) United States Patent
Hammond

(10) Patent No.: US 6,442,768 B1
(45) Date of Patent: *Sep. 3, 2002

(54) COMPACT RECYCLING ELECTRIC DEHYDRATION TOILET

(75) Inventor: W. Scott Hammond, Palm Beach, FL (US)

(73) Assignee: Zerolet, Inc., Lake Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,411

(22) Filed: Mar. 31, 2000

Related U.S. Application Data

(63) Continuation-in-part of application No. 09/305,159, filed on May 4, 1999, now Pat. No. 6,101,638.

(51) Int. Cl.[7] ............................................. A47K 11/02
(52) U.S. Cl. ........................................ 4/111.1; 4/111.6
(58) Field of Search ...................... 4/111.1, 449, 111.5, 4/111.6, 321, 317

(56) References Cited

U.S. PATENT DOCUMENTS

| | | | | |
|---|---|---|---|---|
| 3,673,614 A | * | 7/1972 | Claunch | 4/317 |
| 3,733,617 A | * | 5/1973 | Bennett | 4/111.1 |
| 3,936,888 A | * | 2/1976 | Sturtevant | 4/449 |
| 5,400,443 A | * | 3/1995 | Marino | 4/111.5 |

* cited by examiner

Primary Examiner—David J. Walczak

(57) ABSTRACT

A self-contained toilet that has no water consumption and does not use chemicals. A toilet bowl cleaned by combining compressed air and liquid through jets to reduce flush volume. The flush liquid supply reclaimed through distillation. The dehydration chamber cleaned by scraping and blowing of the waste. The dehydration process coming from a highly efficient heat, air and grinding chamber. The air compressor pressurizing the tank to clean the bowl and/or empty and dehydrate the chamber contents. The compressor intake used to eliminate odors from the bowl and vent the humidity from the dehydration process. The dehydration process controlled through temperature sensors that detect relative humidity. A toilet wherein it will operate while being used, flush within two minutes and the dehydration process able to be interrupted repeatedly with other deposits of human waste then resume operation until fully dehydrated.

14 Claims, 7 Drawing Sheets

COMPACT RECYCLING ELECTRIC DEHYDRATION TOILET

CROSS-REFERENCE TO RELATED APPLICATIONS

This application is a continuation-in-part of Ser. No. 09/305,159, filed on May 4, 1999, now U.S. Pat. No. 6,101,638.

BACKGROUND OF THE INVENTION

1. Field of the Invention

The present invention relates to toilets for disposing of human waste, and particularly to a toilet for human beings that is self contained in a small standard toilet size. The invention recycles liquid for flushing through distillation and eliminates liquid and solid waste through dehydration, evaporation, aeration and grinding, resulting in a dry sanitized disposable waste powder product.

2. Description of Related Art

The use of toilets is almost universal in today's society. Conventional toilets use anywhere from one to seven gallons of water each time the toilet is flushed, at least in most industrialized countries. The waste of water continues whether the human waste is liquid or solid. The net effect is a tremendous consumption of water throughout the United States and other industrialized countries.

Other environments are such that disposing of human waste in lakes and oceans and canals is in some cases prohibited and in other cases certainly undesirable as a way of eliminating human waste. This particular problem is evident in the boating industry with the direct dumping of human waste overboard into the surrounding waters. Thus, there exists in conventional toilet use and in certain environmental impact uses, the need for a toilet for disposing of human waste that does not consume water and that does not result in disposing of raw sewerage or raw human waste into the surrounding environment.

Other forms of disposing of sewerage and human waste include the use of septic tanks which are common in many parts of the United States and which often results in an increased bacterial count of surrounding water supplies, especially during heavy rains and the like. Although many areas are trying to rid themselves of septic tanks, they are still quite common.

Another problem is that chemical toilets utilize very toxic chemicals such as hydrochloric acid or chlorine, which are poured into a holding tank for purification purposes. Often the material can be ground up and treated with very undesirable toxic chemicals that can be harmful to the environment when the entire matter is released.

The present invention solves the problem by providing a toilet that dehydrates, sanitizes and reduces human waste to a safely disposable powder or ash that can be returned to the soil.

Many patents have been issued in which the drying of human waste occurs. Composting toilets such as U.S. Pat. No. 4,364,130 issued Dec. 21, 1982, to Persson are basically boxes with an agitation and aeration apparatus. They reduce the waste by removing the water content through natural ventilation means. This method deposits new waste on top of old, like an outhouse, without eliminating the odor and with very slow and undependable drying. This is undesirable in most cases.

Incineration toilets reduce the water content in human waste through heat as in baking. They also deposit new waste on top of old to deliver clumps of dried waste material. Alternative heat sources have also been used including heat from the tail pipe of an engine to remove wastewater content as in U.S. Pat. No 3,936,888 issued Feb. 10, 1976, to Sturtevant. Here, grinding, pumping and metering delivers a steady flow of waste to a tailpipe for vaporization and the blowing of the waste powder into the air. This method is not desired or allowed in most regions.

U.S. Pat. No. 4,999,930 issued Mar. 19, 1991 to Kishi, et al., shows a device for drying raw sewerage. The device employees a plurality of heat balls which are paddled around and which allow for some dehydration of sewerage. The system here requires a fairly inefficient array of chemical elements, which attempt to dehydrate the waste materials.

U.S. Pat. Nos. 5,152,074, 5,230,164, and 5,564,133 all issued to Kishi continue the drying theory but fail to perform the operation in a small standard size unit. They also fail to explain how the toilet-bowl and intake pipes are flushed clean. They fail to answer many other practical operation problems that are solved within the present invention.

U.S. Pat. No. 5,218,724 issued Jun. 15, 1993 to Blankenship, shows an incinerator toilet with a removal catalyst container. One of the drawbacks of this device is that it uses catalyst pellets for reducing odor, which are inserted and removed for replacement.

U.S. Pat. No. 5,276,924 issued to Hachima, on Jan. 11, 1994, shows a method and apparatus for disposing of body waste that includes inductive heating.

The present invention overcomes the problems of the prior art by providing a compact, clean flushing and extremely efficient toilet. It uses a small amount of electrical energy for dehydration and an efficient grinder for producing a dry powder-like substance that is bagged and return to the environment without water consumption.

BRIEF SUMMARY OF THE INVENTION

A toilet for disposing of human waste safely and sanitarily without chemicals or water consumption. The toilet utilizes compressed air and recycled liquids for toilet bowl cleaning. It is necessary to use both air and liquid for flushing because less force and too much liquid is used in a liquid-only system. With an air-only system, the toilet bowl cannot be cleaned.

A compressor is used to pressurize a tank. The tank air pressure is used to drive an air motor that grinds the waste and scrapes the dehydration chamber clean. The compressor's air intake comes from the top inside of the toilet bowl, drawing out any odors from within the bowl. The compressor then blows this air through the dehydration chamber, aerating and dehydrating the waste material before venting to the outside.

The air intake from the toilet bowl not only deodorizes the bowl while in use but also delivers warm air for dehydration rather than the cold outside air used by some others. Further, the air in this invention is moving at a rate of 2–3 CFM. This slow air flow rate reduces the heat required by other blower fan units that heat and move over 20 CFM.

Compressed air is used for blowing the dry waste into the waste bag and a passive vent chamber is utilized for deodorizing. There is a heating element and a motor underneath the dehydration chamber. Blades are located inside the chamber to grind the material and scrap clean the inside surface of the chamber as air passes slowly through. The resultant powdered waste contents are stored in a bag or container until discarded. At least three sizes are planned; a standard full size toilet, a small compact toilet, and a remote base with a dehydration toilet seat. They will be available in 12 VDC, 120 VAC and 220 VAC electric.

The first improvement includes jet nozzles around and underneath the toilet seat and against the toilet bowl wall. These jets are facing downwards and release a mixture of liquid and air from a pressure tank for cleaning the toilet bowl walls and forcing the waste into the dehydration chamber through the sliding gate valve at the base of the toilet bowl.

The dehydration chamber includes a three-inch slide gate valve located at the top of the chamber (bottom of the bowl) for waste entry. A one and a half-inch slide gate valve is also located on the bottom/side of the chamber for a waste exit. A three-quarter-inch open port on the topside of the chamber vents the steam and odors from the dehydration chamber through the deodorization chamber. There is also a quarter inch open port on the center/side for receiving vent air and air pressure to blow the waste powder into the bagged containment area.

The dehydration chamber's sliding valves are in the closed position when in use. The closed valves allow the dehydration process to be performed from a previous patron while providing an empty clean bowl for use by another patron.

The dehydration chamber also includes a domed heat plate. An electric coil is used to heat the heat plate. An air motor is used to grind the waste and scrape the bottom and sides of the chamber. It is necessary to grind and cut the waste into powder for the waste bag. It is also necessary to scrape the chamber clean so that an insulation layer does not build up reducing efficiency. Exhaust from the air motor goes to the dehydration chamber to assist in ventilation and movement of dried waste into the waste bag at the end of the cycle. The Kishi patent uses balls that will not cut and shred the material nor clean and scrape the insides of a chamber nor assist in ventilation.

This liquid is reclaimed through a copper coil, distilled from the steam created in the dehydration process. This distilled liquid is held in a reservoir that fills the flush chamber underneath. The flush chamber is pressurized with air to clean the toilet bowl. When the reservoir is full the excess water with steam and gas exit through the vent pipe. Under the reservoir is a flush chamber which holds one cup of liquid. When it is full, a ball floats to the top closing off the reservoir. When air pressure is sent to the flush chamber the float ball remains at the top closing off the reservoir while the water and air inside the chamber is mixed and sent to the bowl jets, flushing the toilet. When the flush cycle ends, the air pressure stops, making the float ball fall to the bottom of the chamber to allow liquid from the reservoir to enter until full and the ball is on top again.

There are two temperature sensors in the toilet. One sensor is in the heater controlling its temperature between 250 and 3000 degrees F. The other sensor is in the vent pipe detecting the difference between high steam heat over 212 degrees F and low dry heat under 200 degrees F. When the heat is high the dehydration process continues but when the temperature drops below 200 degrees there is no steam, this ends the dehydration process and blows the waste powder into the holding bag or container. Detecting the relative humidity through the temperature of the steam to regulate the toilet cycle will allow the unit to know when to end the heating process. It does not have to be programmed to run one hour like many others, when only five minutes may be needed for dehydrating a small deposit or may run up to an hour with large or multiple deposits.

The toilet can be used immediately after flushing and ready for another flush when the tank is pressurized within two minutes.

When a person has completed use of the toilet, the operation button is pushed. This opens the bowl valve and releases compressed air to the flush chamber sending liquid and air to clean the bowl. Sitting on the toilet seat will also start the compressor to draw odor from the toilet bowl while in use. The compressor will also be on during the dehydration process to aerate the dehydration and assist in venting. The compressor is only off when the tank is full, the dehydration process is complete, the dehydration chamber is empty and there is no one sitting on the seat.

There are three indicator lights. The green flush button light indicates that the tank is pressurized and ready to flushing. The yellow light indicates that the waste bag is heavy and it is time to change the waste bag. The red light indicates a fault in the toilets operation. If the red button pushed, it will open the bowl valve and shut down the unit for five minutes.

The dehydration chamber can hold multiple deposits on top of each other, at any time, even though the dehydration process is not completed and the waste is not dry enough for bagging. The vent temperature sensor will control the appropriate time needed for the dehydration process.

In accordance with these and other objects which will become apparent hereinafter, the instant invention will now be described with particular reference to the accompanying drawings.

DETAILED DESCRIPTION OF THE INVENTION

Figure 1:
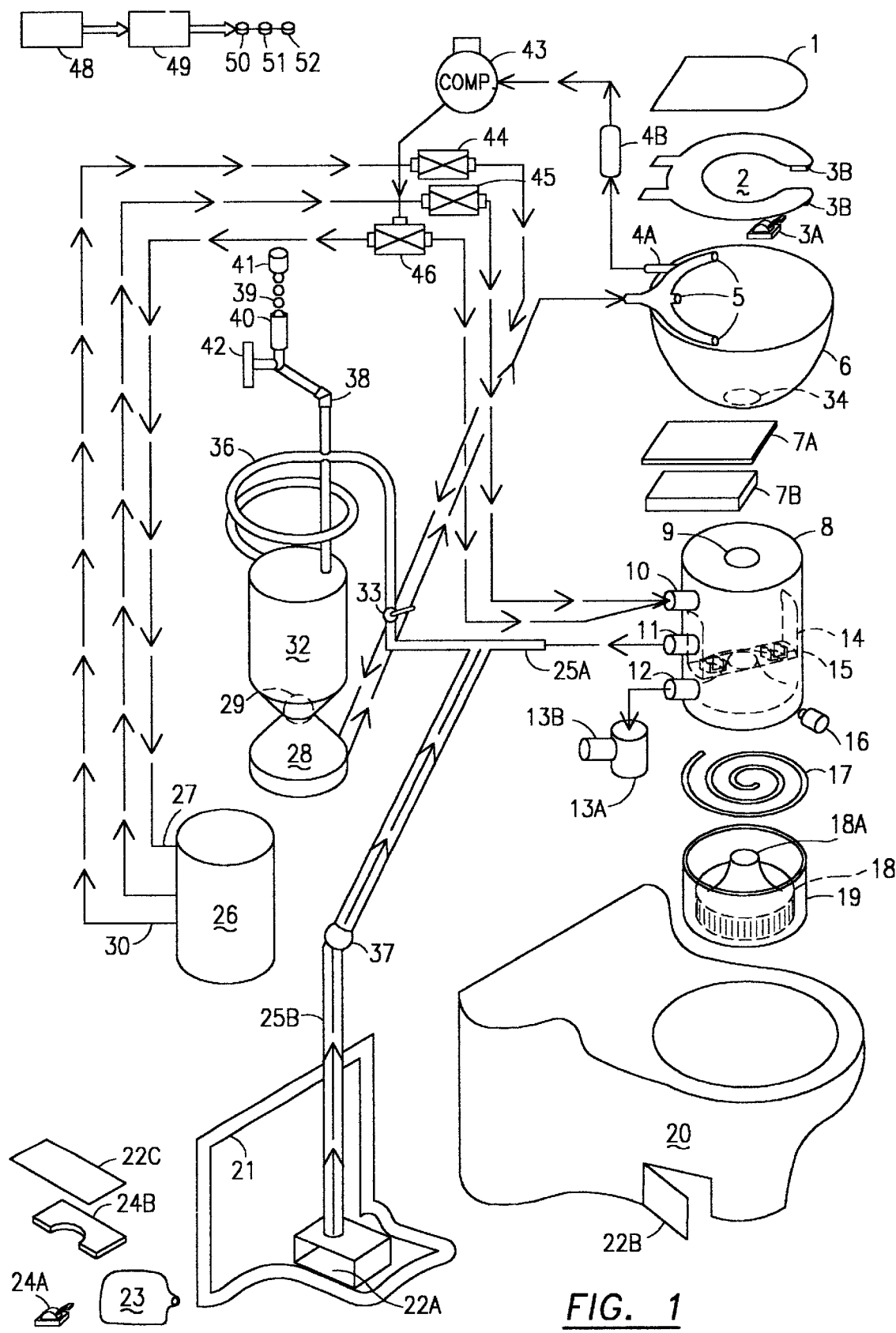
FIG. 1 shows an exploded, side perspective view of the present invention.

Referring now to the drawings and in particular FIG. 1, the exploded view of the present invention is shown generally comprising a toilet cabinet 20 made out of a plastic material with a bottom part 21 made from the same material. The toilet cabinet bottom part has a waste chamber 22A also of the same material. On the side of cabinet 20 is a waste door 22B to access waste chamber 22A. On the floor of the waste chamber there is foam rubber or springs 24B that are set with the appropriate tension depending on bag and chamber size as to cause a floor plate 22C to close normally open contact switch 24A and turn the bag full light 51 on when full.

A toilet lid 1 and a seat 2 are on top of cabinet 20. Preferably, the seat 2 and cabinet 20 is the approximate size of a conventional water toilet. Underneath seat 2 is foam rubber or springs 3B which when compressed close a contact switch 3A activating compressor 43 to deodorize the toilet bowl 6 when in use.

Underneath seat 2 and inside the cabinet 20 is bowl 6. Bowl 6 has a compressor intake 4A located at the top rear of bowl 6. It is connected to a compressor muffler 4B then to compressor 43. Bowl 6 also has a number of cleaning jet nozzles 5, depending on bowl size. They are connected to valve 44 which releases pressure from an air tank 26 in order to clean bowl 6 with a combination of liquid and air mixed from the flush chamber 28. Flush chamber 28 is closed off from the reservoir by float ball 29. Bowl 6 has an opening 34 at its bottom, with a three-inch sliding bowl valve 7A operated by an actuator 7B.

Chamber 8 for dehydration has four ports. The toilet bowl 6 and the dehydration chamber 8 can be separated from the rest of the apparatus and placed in a remote location. One is a bowl port 9 which is connected to valve 7A. The second is air port 10 which is a ¼ inch side port receiving air from the compressor through three way valve 46 or clean valve 45. The third port is vent port 11 which is connected to a steam and gas vent pipe 25A and distilled through pipe 36 or vented outside through a vent port 42. The fourth port is a waste port 12 which is opened by waste valve 13A operated by actuator 13B connected to a waste bag 23. The air blowing into waste bag 23 exits through vent pipe 25B past valve 37 to outside port 42. Inside chamber 8 are cutting blades 15 and scraping blades 14 which are connected to drive motor 18 by drive shaft 18A contained in motor case 19. In the preferred embodiment, the drive motor operates at approximately 0.5 kW; however, for some applications, more energy may be used. The heater coil 17 has a heater sensor 16 to control the temperature of the dehydration chamber.

Tank 26 has two ports. The first port 27 is an air pressure intake from compressor 43 through three-way valve 46. The second port is an exit port 30 to be used by valve 44. Three way valve 46 allows compressor 43 to blow through the valve to the dehydration chamber 8 or when energized and closed allowing compressor 43 to fill and pressurize tank 26.

Other components include the deodorization pipe 40 which is connected to vent 42. Pipe 40 contains deodorization balls 39 and cap 41. Back flow check valve 38 prevents gasses from flowing into the unit and the normally closed spring switch sensor 39B (FIG. 4) operates an indicator light when it is time to add deodorization balls. Deodorization balls may be made from quick lime, chlorine, camphor or other material used in urinals and like materials.

A liquid reservoir 32 is connected at its top to pipe 36 and at its bottom to flush chamber 28. Liquid, such as water including that reclaimed by the apparatus, is received by chamber 28 from reservoir 32. Antifreeze may also be used either alone or in addition to said liquid to prevent freezing and aid in distillation reclamation.

The controlling electronics come from a relay board 48, microprocessor board 49 and buttons 50 and 52. Start button 50 starts the flush cycle when the green ready light indicates a full tank for flushing. A delay will occur when the flush button is pushed if the tank is not full. Yellow indicator light 51 indicates that the waste bag is full. When emergency off button 52 is pushed, the unit will shut down, the bowl valve will open and the light will be red indicating that trouble exists. An optional light would indicate time to add deodorization balls.

The method of operating the toilet of the present invention is as follows. Open bowl valve 7A. Open bowl cleaning air and liquid valve 44. Close valve 44 and valve 7A. Activate heater coil 17 regulated by heater sensor 16. Activate compressor 43 and valve 46 to fill tank 26 with liquid such as water. Start button light 50 is on when tank 26 is full. De-activate valve 46 for compressor 43 to circulate air through port 10 into chamber 8. Drive motor 18 will turn blades 15 to operate for one second per minute. When vent sensor 33 reads that the temperature is low, motor 18 and heater 17 are shut off, then waste valve 13A opens and motor 18 comes on for five seconds scraping and blowing the dried waste through chamber port 10 into bag 23 thereby emptying the chamber 8. Waste valve 13A is then closed and three-way valve 46 is activated to re-fill the tank 26 with reclaimed liquid such as water, completing the cycle.

Figure 2:
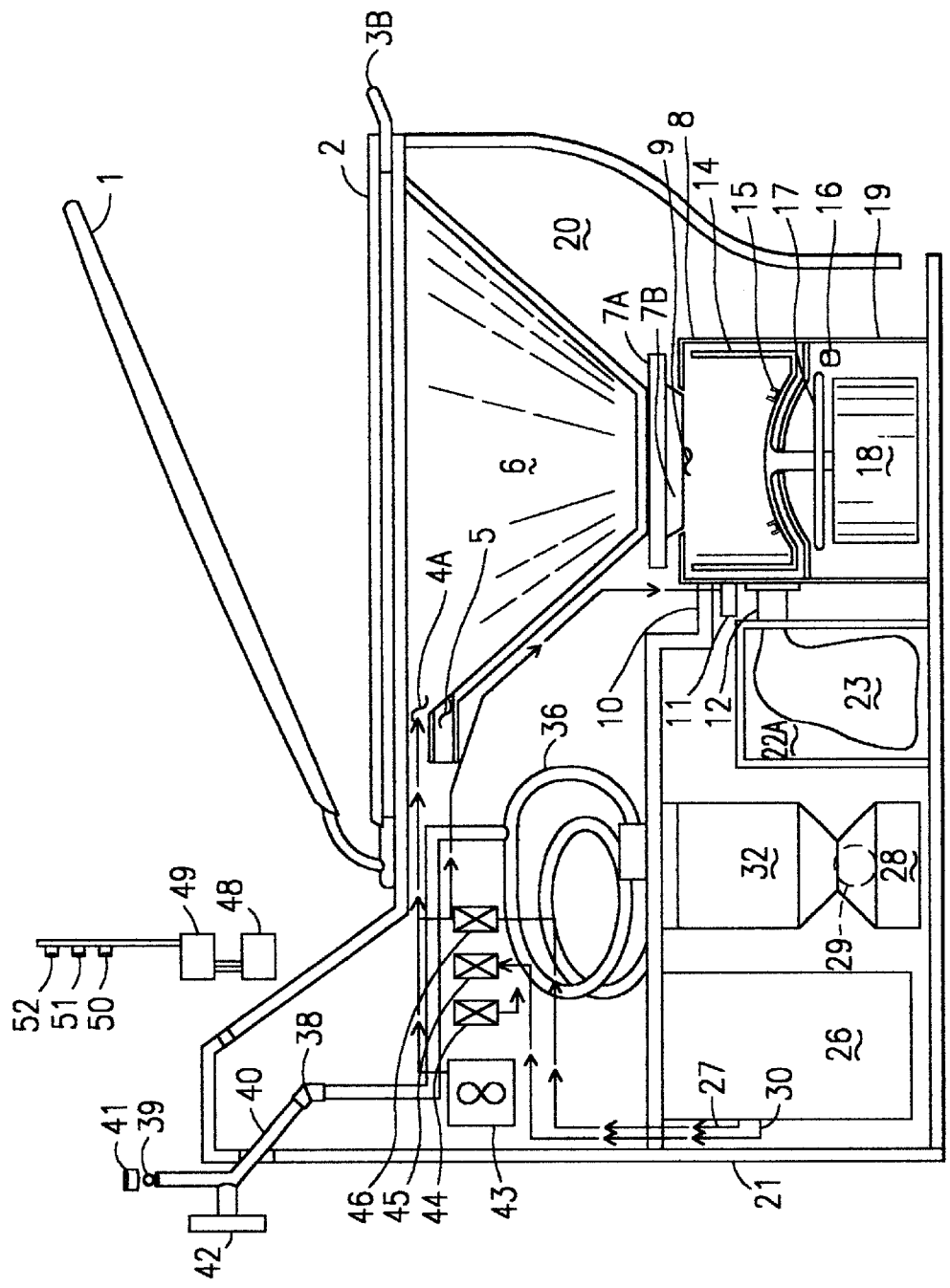
FIG. 2 shows a side elevation view showing the present invention with the toilet lid open

Referring now to FIG. 2, the side view of the present invention is shown generally comprising the components referred to in FIG. 1. FIG. 2 depicts these components placed in their respective locations.

Figure 3:
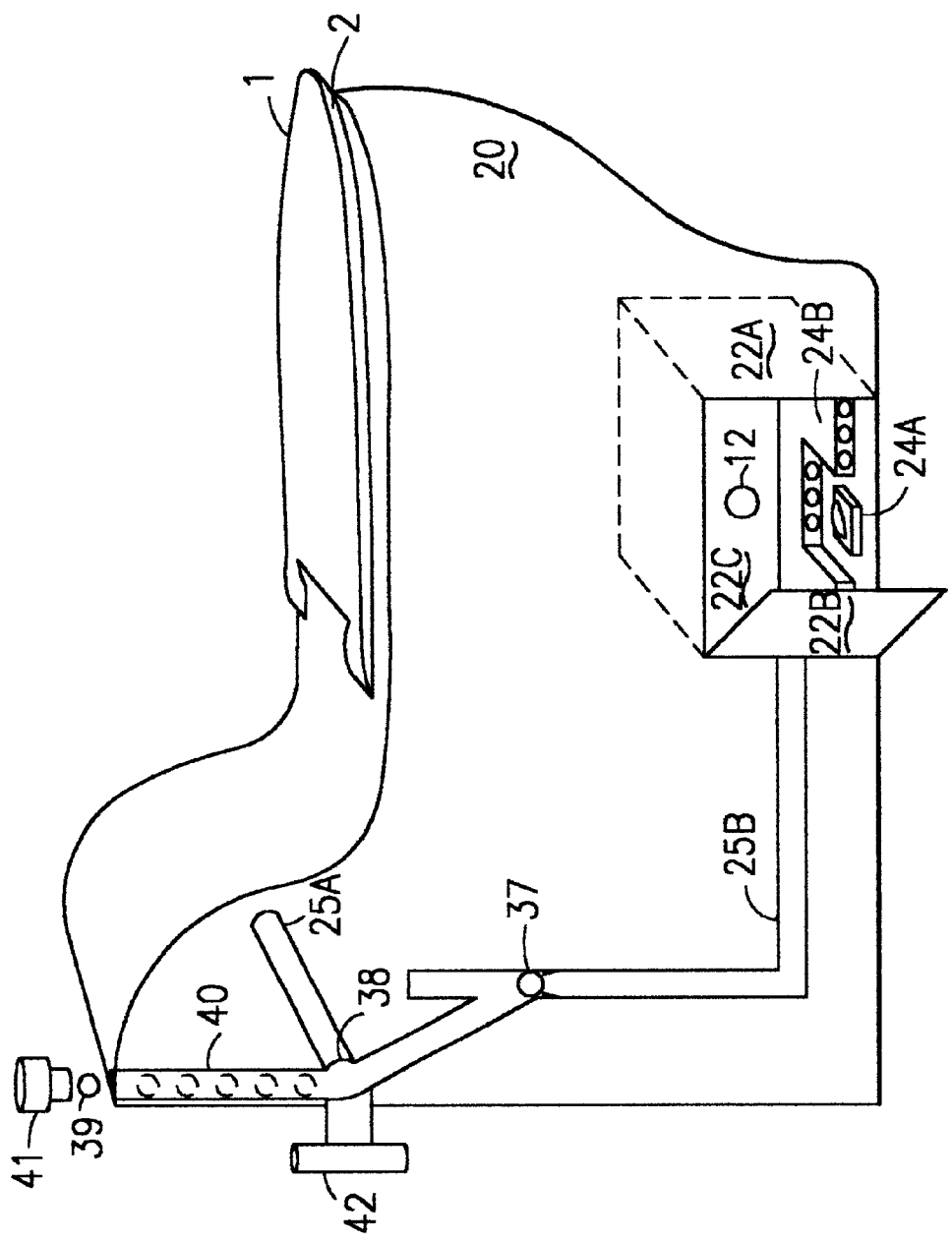
FIG. 3 shows a side view with waste bag door with weight sensor.

Referring now to FIG. 3, the waste chamber of the present invention is shown generally comprising of waste chamber 22A being approximately 3"×6"×6" and has a waste powder intake from port 12 from chamber 8. The waste chamber is closed off by door 22B. The waste chamber also has a floor plate 22C. Preferably, underneath floor plate 22C is a foam rubber pad or springs 24B surrounding a normally open contact switch 24A. The springs or foam is compressed when bag 23 is full; this closes the contact switch 24A turning on bag full light 51.

In an alternate embodiment, a container instead of a bag could be used and emptied or an attachment for a vacuum cleaner could suck the waste out of the bowl as with multiple units to a central vacuum and holding container.

Figure 4:
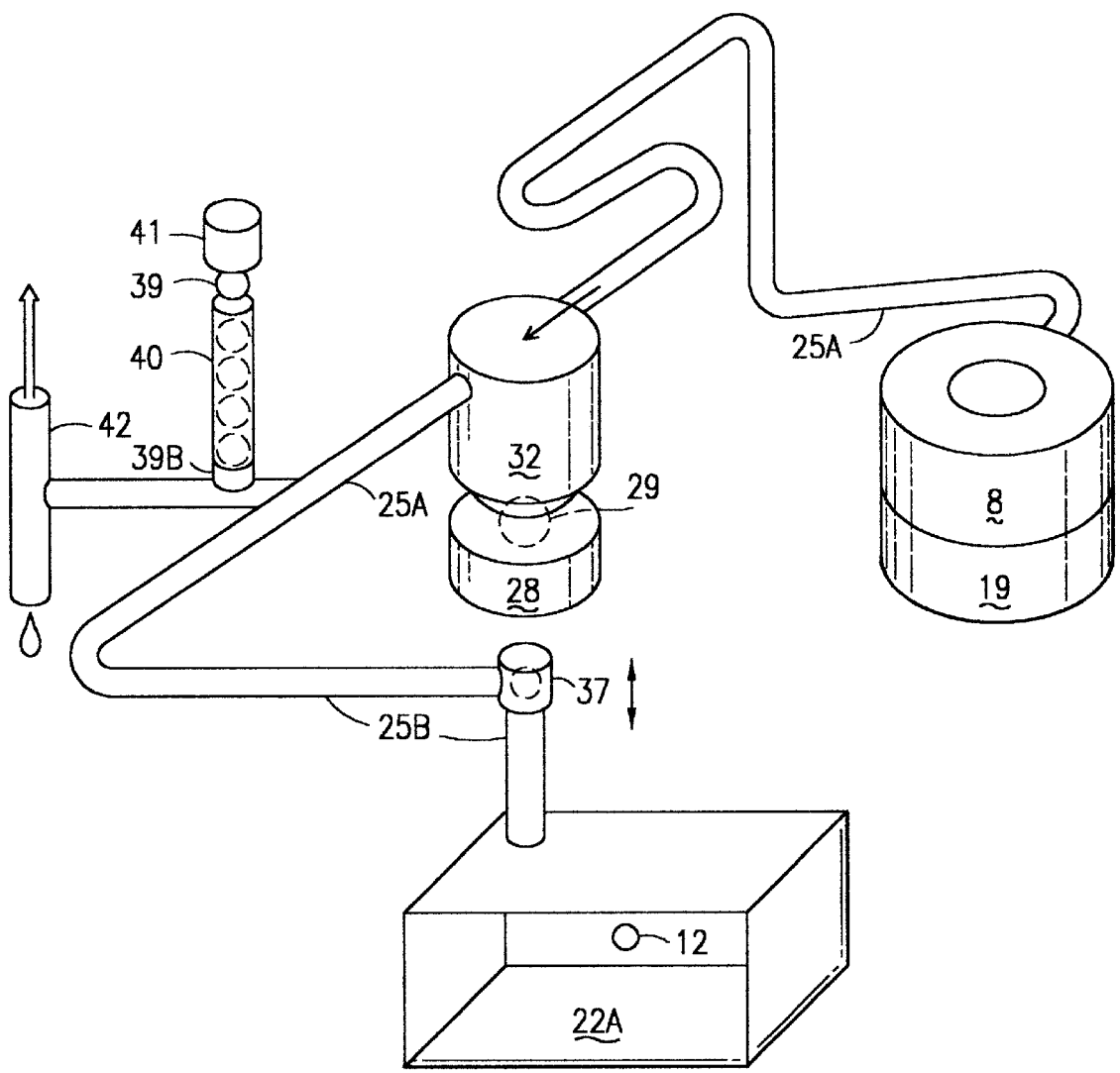
FIG. 4 shows the deodorization balls with back flow check valves and vent pipes.

Referring now to FIG. 4, the deodorization and ventilation system of the present invention is shown generally comprising vent pipes 25A and 25B, each having a ¾ inch diameter. This diameter is used because larger pipes make the temperature sensor readings slow and smaller pipes restrict the steam and airflow for proper operation. The pipes can be made of copper, aluminum, steel or high temperature plastic. The temperature of the pipes could reach over 200 degrees directly out of dehydration chamber 8. When the reservoir liquid level is high, the steam and distilled water surplus exit through vent pipe 25A to outside port 42. Waste chamber 22A uses vent pipes 25B to exit air from dehydration waste port 12. Valve 38 (not shown) opens to vent outside and closes to prevent back flow of gases. The same is true for check valve 37 preventing steam and gasses from vent pipe 25A to enter waste chamber 22A.

Located in deodorization pipe 40 are the deodorizing balls 39 entering pipe 40 through the back of the toilet with cap 41. There is a screen that the balls rest on. The steam and air pass by balls 39 and out through vent 40. When the steam and air dissolve balls 39 in pipe 40, another ball in pipe 40 takes its place. When there are no balls left, sensor switch 39B detects this and turns on a warning light.

Figure 5:
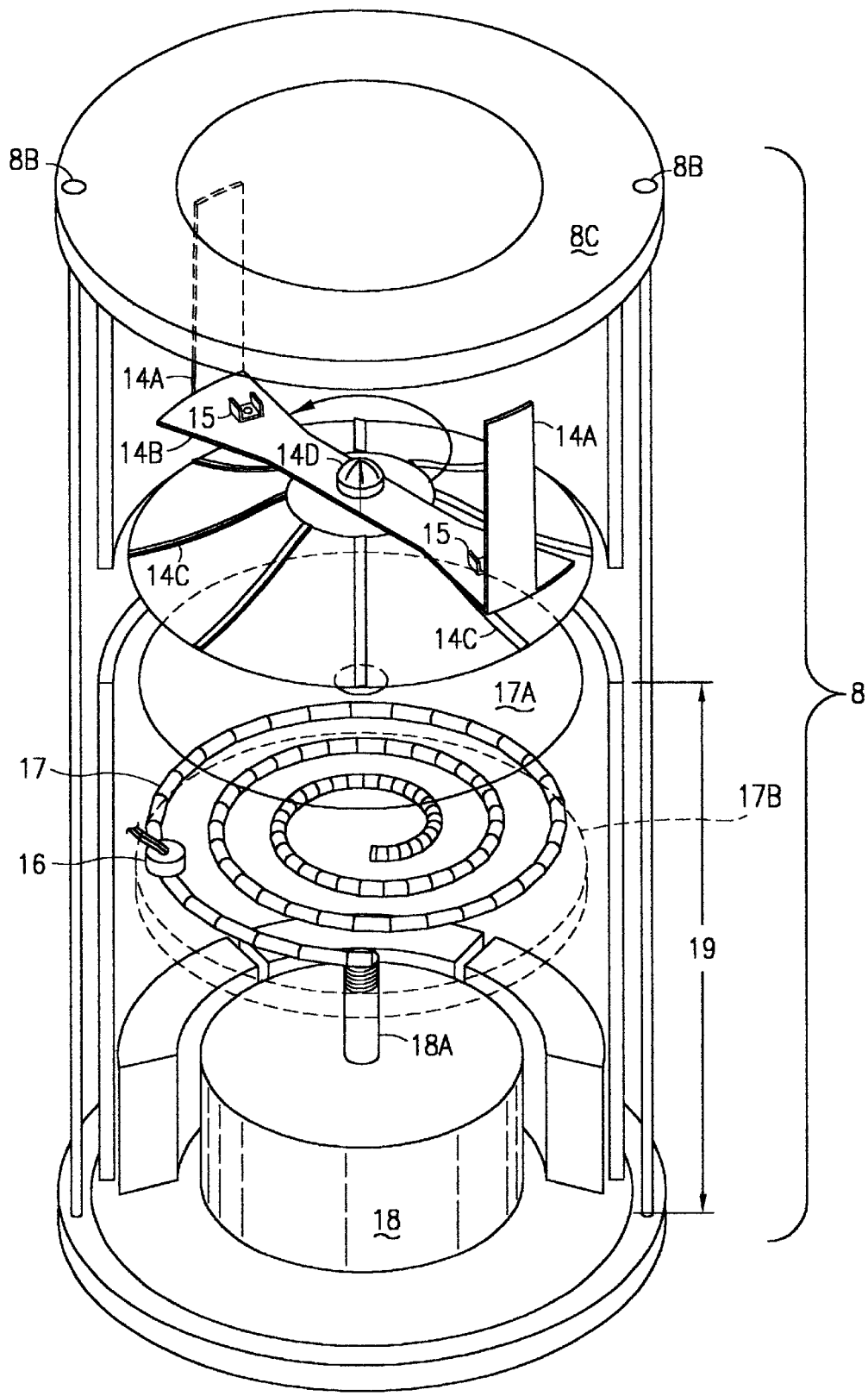
FIG. 5 shows the dehydration chamber with the grinding and scraping blade configuration and heating element.

Referring now to FIG. 5, the dehydration chamber of the present invention is shown generally comprising a dehydration chamber 8 and electric motor casing 19. Nuts and long bolts 8B connect chamber 8 to top 8C and motor casing 19. Inside is drive motor 18 and drive shaft 18A. On top of the motor are two thin insulation boards 17A and 17B. Board 17A is on the top and board 17B is on the bottom of heater coil 17. The insulation protects coil 17 from grounding out on motor casing 19 and chamber 8. The insulation also reduces heat transfer to motor 18.

Inside chamber 8 are cutting blades 15 and scraping blades 14. The cutting and scraping unit consists of two side scraper blades 14A attached to mounting cross bar 14B. Angled down and off cross bar 14B are bottom scraper blades 14C which act like snow plows lifting material from the hot chamber floor and throwing it over and past cutting blades 15. Cutting blades 15 are sharpened metal channels attached to bar 14B by a rivet in the center of the channel that the channel spins on, cutting the material as it passes by. A domed nut 14D connects the unit to motor 18 by threading on to drive shaft 18A.

Figure 6:
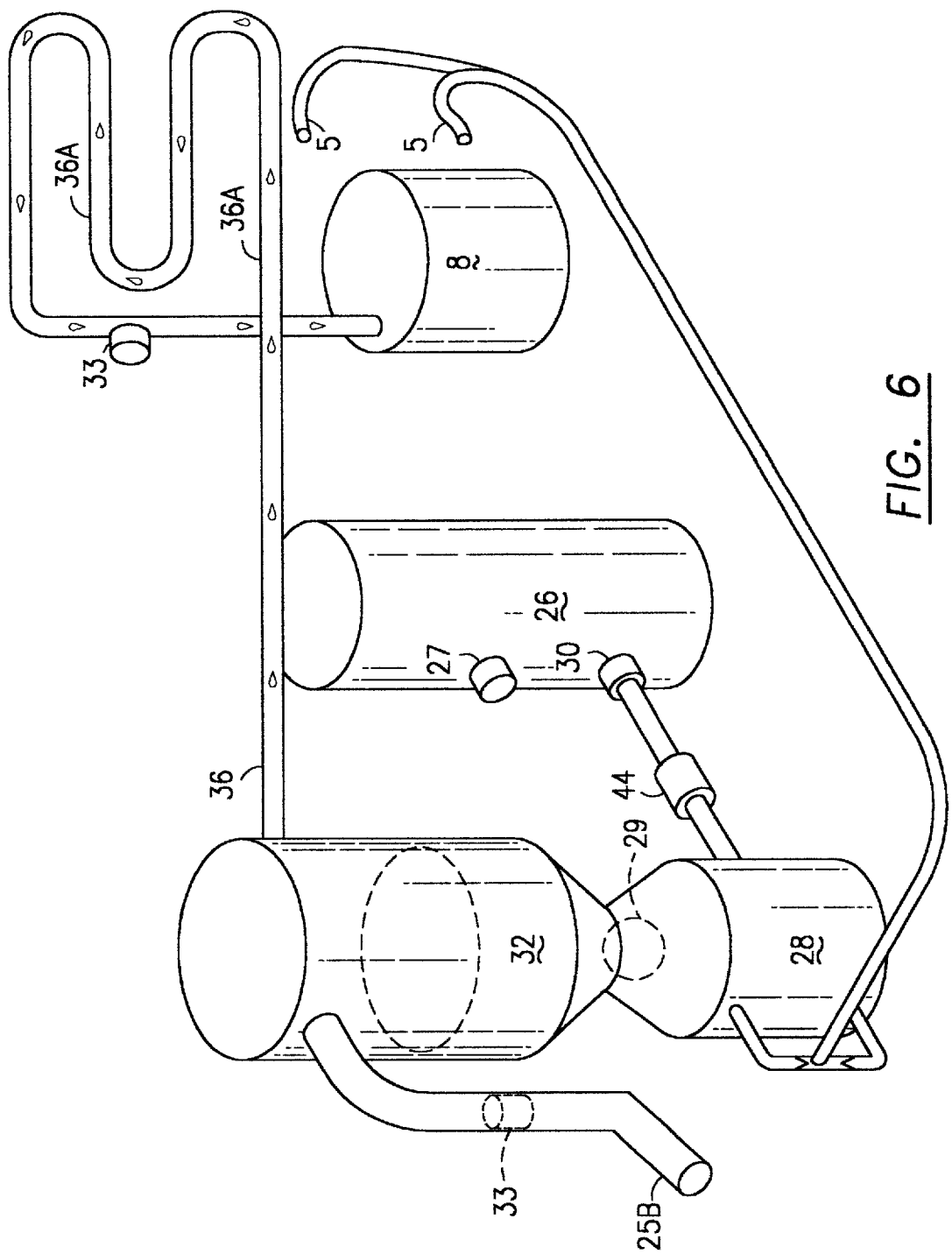
FIG. 6 shows the distillation coil with the air/water flush system, reservoir, foot valve and tank.

Referring now to FIG. 6, the distillation system of the present invention is shown generally comprising an air tank 26 and a liquid reservoir 32 that connects to the distillation pipe 36. The distillation pipe 36 is preferably one or more cooling coils used in the distillation process. Preferably, the dehydration process uses the cooling coils to distill steam and reclaim water for flushing. Vent pipe 25B passes steam by vent sensor 33 to sense when the heater should start and finish. Under reservoir 32 is flush chamber 28. Chamber 28 receives liquid from reservoir 32, when full float ball 29 raises to the top. When air pressure from tank 26 enters through valve 44, float ball 29 is pressed closed against the opening of the reservoir and the air and liquid is then mixed with the pressure sent to jets 5 to increase cleaning force used to clean the toilet bowl.

Figure 7:
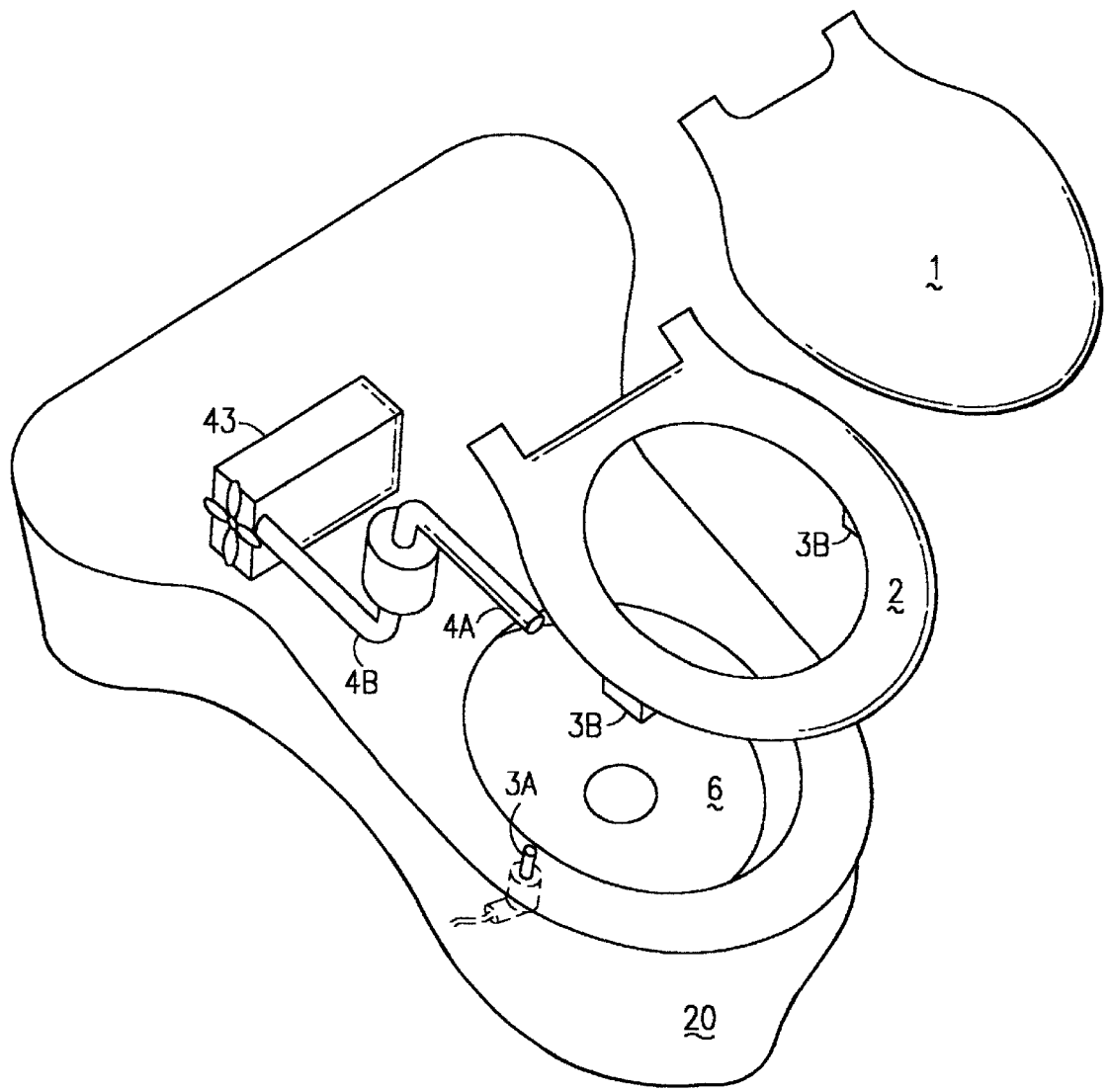
FIG. 7 shows the seat sensor with compressor intake and muffler.

Referring now to FIG. 7, the bowl deodorization system of the present invention is shown generally comprising a toilet seat 2 and lid 1 on top of cabinet 20 with contact switch 3A and compressor 43 inside. Thus, in the preferred embodiment, the toilet is self-contained and the same size as most water toilets. You will notice that there are two foam rubber pads or springs 3B attached to the seat, contact switch 3A comes up from cabinet so as to come in contact with the seat 2. When the seat has weight applied to it, it is compressed and switch 3A closes turning compressor 43 on so that air from bowl 6 is drawn in to compressor intake 4A through muffler 4B and exits through the dehydration chamber 8 to the outside vent 42.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. An apparatus for safely disposing of human waste without water consumption or chemicals consumption, which electrically produces a dry powdered waste product comprising:
    a toilet bowl;
    an air nozzle directing air into said bowl;
    a heater for heating said waste;
    a grinder for grinding said waste into a powder, said grinder connected to said toilet bowl; and
    a receptacle for recovering said powdered waste.

2. An apparatus for safely disposing of human waste without water consumption or chemicals consumption, which electrically produces a dry powdered waste product comprising:
    a toilet bowl;
    means for distributing directed air and liquid into said bowl;
    means for drying waste connected to said bowl, said means for drying waste including means for the waste to enter and means for the waste to exit;
    means for cleaning waste from the bowl disposed within said bowl; and
    a waste receptacle for recovering dried waste produced by said means for drying waste,
    wherein said means for drying waste is a dehydration chamber,
    wherein said air and said reclaimed liquid are combined for flushing of said toilet bowl in order to increase cleaning force,
    and wherein said liquid is reclaimed water.

3. The apparatus of claim 2, wherein said reclaimed water is reclaimed through distillation from a dehydration process occurring within said dehydration chamber and said reclaimed water and said air are used for flushing said toilet bowl.

4. An apparatus for safely disposing of human waste without water consumption or chemicals consumption, which electrically produces a dry powdered waste product comprising:
    a toilet bowl;
    means for distributing directed air and liquid into said bowl;
    means for drying waste connected to said bowl, said means for drying waste including means for the waste to enter and means for the waste to exit;
    means for cleaning waste from the bowl disposed within said bowl; and
    a waste receptacle for recovering dried waste produced by said means for drying waste
    wherein said means for drying waste is a dehydration chamber,
    wherein said means for cleaning waste from the bowl include one or more blades disposed within said dehydration chamber,
    wherein said dehydration chamber has an inside surface and a bottom, and said blades are used to clean the sides and the bottom of said dehydration chamber.

5. An apparatus for safely disposing of human waste without water consumption or chemicals consumption, which electrically produces a dry powdered waste product comprising:
    a toilet bowl;
    means for distributing directed air and liquid into said bowl;
    means for drying waste connected to said bowl, said means for drying waste including means for the waste to enter and means for the waste to exit;
    means for cleaning waste from the bowl disposed within said bowl; and
    a waste receptacle for recovering dried waste produced by said means for drying waste,
    further comprising an air compressor and a drive motor to blow the dried waste into said receptacle.

6. The apparatus of claim 5 wherein the compressor further comprises a compressor intake, wherein said intake is located proximate to said toilet bowl and is activated by a weight sensor switch activated when weight is applied to said bowl.

7. The apparatus of claim 3, further comprising a heat sensor to discern between steam and dry heat in order to control said dehydration process.

8. An apparatus for safely disposing of human waste without water consumption or chemicals consumption, which electrically produces a dry powdered waste product comprising:
    a toilet bowl;

means for distributing directed air and liquid into said bowl;

means for drying waste connected to said bowl, said means for drying waste including means for the waste to enter and means for the waste to exit;

means for cleaning waste from the bowl disposed within said bowl; and a waste receptacle for recovering dried waste produced by said means for drying waste, wherein said means for drying waste is a dehydration chamber, wherein said dehydration chamber includes four ports, one for waste entry, one for air intake, one for venting and one for waste exit.

9. An apparatus for safely disposing of human waste without water consumption or chemicals consumption, which electrically produces a dry powdered waste product comprising:

a toilet bowl;

means for distributing directed air and liquid into said bowl;

means for drying waste connected to said bowl, said means for drying waste including means for the waste to enter and means for the waste to exit;

means for cleaning waste from the bowl disposed within said bowl; and a waste receptacle for recovering dried waste produced by said means for drying waste, further comprising one or more one way valves, wherein beyond said one way valves are balls which dissolve and deodorize during venting.

10. The apparatus of claim 9 wherein said balls can be made from materials including quick lime, chlorine, or camphor.

11. The apparatus of claim 3 wherein energy used by the drive motor is about 0.5 kW.

12. An apparatus for safely disposing of human waste without water consumption or chemicals consumption, which electrically produces a dry powdered waste product comprising:

a toilet bowl;

means for distributing directed air and liquid into said bowl;

means for drying waste connected to said bowl, said means for drying waste including means for the waste to enter and means for the waste to exit;

means for cleaning waste from the bowl disposed within said bowl; and a waste receptacle for recovering dried waste produced by said means for drying waste, wherein suction can be used to suck the waste out from a container of waste as with multiple units to a central vacuum and holding container.

13. The apparatus of claim 3 wherein said dehydration process uses cooling coils to distill steam and reclaim water for flushing.

14. An apparatus for safely disposing of human waste without water consumption or chemicals consumption, which electrically produces a dry powdered waste product comprising:

a toilet bowl;

means for distributing directed air and liquid into said bowl;

means for drying waste connected to said bowl, said means for drying waste including means for the waste to enter and means for the waste to exit;

means for cleaning waste from the bowl disposed within said bowl; and a waste receptacle for recovering dried waste produced by said means for drying waste, further comprising antifreeze to be used either alone or in addition to said liquid to prevent freezing and aid in distillation reclamation.

* * * * *